United States Patent
Gutierrez et al.

(10) Patent No.: US 10,823,356 B1
(45) Date of Patent: Nov. 3, 2020

(54) DEVICE AND METHOD OF FOCUSING A LIGHT

(71) Applicant: Valeo Vision SAS, Bobigny (FR)

(72) Inventors: Horacio Gutierrez, Seymour, IN (US); Julien Hemon, Seymour, IN (US); Alexis Debiard, Seymour, IN (US)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 16/723,061

(22) Filed: Dec. 20, 2019

(51) Int. Cl.
*F21S 41/19* (2018.01)
*B60Q 1/068* (2006.01)
*F21S 45/47* (2018.01)

(52) U.S. Cl.
CPC .......... *F21S 41/192* (2018.01); *B60Q 1/0683* (2013.01); *F21S 45/47* (2018.01); *B60Q 2200/30* (2013.01)

(58) Field of Classification Search
CPC . F21S 41/192; B60Q 1/0683; B60Q 2200/30; B60Q 2200/34
See application file for complete search history.

(56) References Cited

U.S. PATENT DOCUMENTS

| | | | |
|---|---|---|---|
| 4,404,741 A | 9/1983 | Lebet et al. | |
| 5,119,275 A * | 6/1992 | Makita | B60Q 1/0683 362/459 |
| 5,730,522 A * | 3/1998 | Wyke | F21V 19/00 248/200 |
| 9,772,092 B2 | 9/2017 | Bauder | |
| 9,829,171 B2 * | 11/2017 | Puente | F21V 17/007 |
| 2006/0092653 A1 * | 5/2006 | Tachiiwa | B60Q 1/0683 362/507 |
| 2008/0151547 A1 | 6/2008 | Grotsch et al. | |
| 2008/0224287 A1 | 9/2008 | Aizpuru et al. | |
| 2008/0266890 A1 * | 10/2008 | Mochizuki | F21S 41/675 362/524 |
| 2009/0251918 A1 | 10/2009 | Engl et al. | |
| 2009/0303726 A1 | 12/2009 | Borgschulte et al. | |
| 2010/0118550 A1 | 5/2010 | Kuo | |
| 2012/0257400 A1 | 10/2012 | Shibata | |
| 2013/0039072 A1 | 2/2013 | Kim et al. | |
| 2013/0215632 A1 * | 8/2013 | Jackl | F21S 41/192 362/514 |
| 2013/0258667 A1 | 10/2013 | Ray et al. | |
| 2014/0043806 A1 | 2/2014 | Schaefer et al. | |
| 2014/0346318 A1 | 11/2014 | Hardegger et al. | |

(Continued)

FOREIGN PATENT DOCUMENTS

EP 2966343 A1 1/2016
EP 2775197 B1 2/2016

(Continued)

*Primary Examiner* — William N Harris

(74) *Attorney, Agent, or Firm* — Young Basile Hanlon & MacFarlane, P.C.

(57) ABSTRACT

A light system comprising: (a) a vehicle connector configured to connect to a vehicle; (b) a light connector in communication with the vehicle connector, the light connector being movable relative to the vehicle connector; and (c) a bias member connected to the light connector and extending into contact with the vehicle connector so that as the light connector is adjusted the bias member creates a bias force to move the light connector away from the vehicle connector or the bias member is compressed to store energy.

20 Claims, 7 Drawing Sheets

(56) References Cited

U.S. PATENT DOCUMENTS

| | | | |
|---|---|---|---|
| 2015/0204503 A1* | 7/2015 | Krenn | F21S 41/151 |
| | | | 362/514 |
| 2015/0266407 A1 | 9/2015 | Rubia Mena et al. | |
| 2015/0338049 A1 | 11/2015 | Cabanne et al. | |
| 2015/0377439 A1 | 12/2015 | Madelaine et al. | |
| 2015/0377440 A1 | 12/2015 | Reitegger et al. | |
| 2016/0363285 A1 | 12/2016 | Mornet | |
| 2017/0080847 A1 | 3/2017 | Zhang | |
| 2017/0241625 A1 | 8/2017 | Trottier et al. | |
| 2017/0336044 A1* | 11/2017 | Song | F21S 41/36 |
| 2017/0370550 A1 | 12/2017 | Japs et al. | |
| 2018/0031194 A1 | 2/2018 | Seiger et al. | |
| 2018/0086249 A1 | 3/2018 | Dorn et al. | |
| 2018/0087730 A1 | 3/2018 | Dubuc et al. | |
| 2018/0087733 A1 | 3/2018 | Hermitte et al. | |
| 2018/0283647 A1 | 10/2018 | Hemon | |
| 2018/0292064 A1 | 10/2018 | Zhou et al. | |
| 2020/0224844 A1* | 7/2020 | Hunt | F21S 45/47 |

FOREIGN PATENT DOCUMENTS

| | | |
|---|---|---|
| EP | 2693108 B1 | 8/2016 |
| EP | 3321570 A1 | 5/2018 |
| FR | 3048655 A1 | 9/2017 |
| WO | 19076914 A1 | 4/2019 |
| WO | 19110475 A1 | 6/2019 |

\* cited by examiner

DEVICE AND METHOD OF FOCUSING A LIGHT

FIELD

The present teachings relate a device and method of focusing a light and specifically focusing a headlight of a vehicle along a z-axis of the light.

BACKGROUND

Vehicles typically include multiple sets of external lights that are designed to project in a predetermined direction. However, there may be some variance from light to light that may cause the lights to focus outside of a desired region or may cause the lights to focus inconsistently with each other. This difference of focus may cause one or more of the lights to be rejected.

Examples of lighting systems may be disclosed in US Publication Nos. 2015/0338049; 2017/0241625; 2018/018292064; and 2018/0283647 all of which are expressly incorporated herein by reference for all purposes. Thus, there is a need for a device that is adjustable to accommodate for dimensional variations in the light sources. It would be desirable to have a process of adjusting each of the light sources so that the light sources may be focused to a desired position. There is a need for a device that is deformable so that the device can be corrected for any manufacturing inconsistencies. It would be desirable to have a light source, heatsink, printed circuit board, or a combination thereof that are adjustable in the x-direction, y-direction, preferably the z-direction, or a combination thereof.

SUMMARY

The present teachings provide: a light system comprising: (a) a vehicle connector configured to connect to a vehicle; (b) a light connector in communication with the vehicle connector, the light connector being movable relative to the vehicle connector; and (c) a bias member connected to the light connector and extending into contact with the vehicle connector so that as the light connector is adjusted the bias member creates a bias force to move the light connector away from the vehicle connector or the bias member is compressed to store energy.

The present teachings provide: a method comprising: (a) adjusting a lighting system of a vehicle by moving a light connector relative to a vehicle connector; (b) deflecting a bias member between the light connector and the vehicle connector when the light connector is moved towards a lowered position; and (c) releasing energy from the bias member when the light connector is moved towards a raised position so that the bias member moves the light connector away from the vehicle connector.

The present teachings provide a device that is adjustable to accommodate for dimensional variations in the light sources. The present teachings provide a process of adjusting each of the light sources so that the light sources may be focused to a desired position. The present teachings provide a device that is deformable so that the device can be corrected for any manufacturing inconsistencies. The present teachings provide a light source, heatsink, printed circuit board, or a combination thereof that are adjustable in the x-direction, y-direction, preferably the z-direction, or a combination thereof.

DETAILED DESCRIPTION

Figure 1:
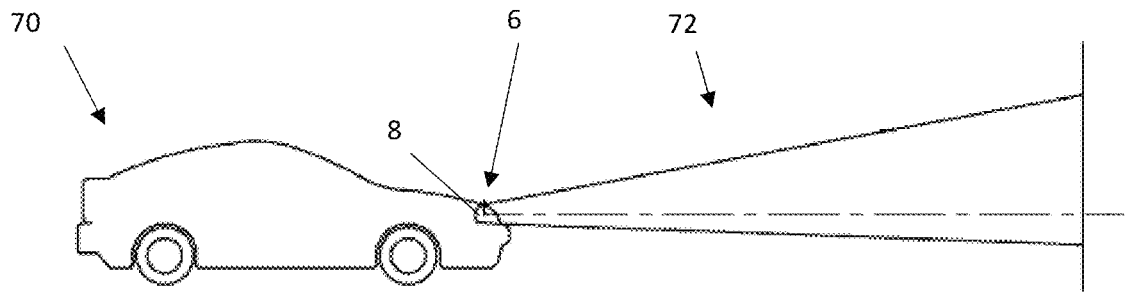
FIG. 1 is a side view of a vehicle including the lighting system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a lighting system that is connected to a vehicle by a vehicle bracket. The vehicle bracket functions to support the lighting system so that light is directed out of the vehicle in a direction of interest. The vehicle bracket may be static, fixed, part of a vehicle frame, or a combination thereof. The vehicle bracket may connect to a lighting system, support a vehicle connector of a lighting system, or both.

The lighting system functions to provide light to a region surrounding a vehicle. The lighting system preferably provides light in a forward direction or a rearward direction of a vehicle. The lighting system may be one headlight of a vehicle. The lighting system may have some directionality. The lighting system may direct light away from the vehicle, the vehicle bracket, or both, in a predetermined direction. The lighting system may have one or more light sources (e.g., bulbs, light emitting diodes, lamps) that provide light in a predetermined direction. The lighting system may include one or more lighting connectors, one or more vehicle connectors, or both that direction a light source in a desired direction, to a desired region, or both. The lighting system may include one or more light sources and preferably a plurality of light sources.

The light source functions to provide light in a direction of interest. The light source may create light. The light source may be any type of lighting device that produces light such as an incandescent bulb, fluorescent light, compact fluorescent lamp, halogen lamp, light emitting diode (LED), high intensity discharge lamps (HID); halogen lights, xenon lights, or a combination thereof. The light source may be a single lamp or bulb. Preferably, the light source includes a plurality of lamps, bulbs, diodes, or a combination thereof. The light source may be an array. The light source may include two or more, 5 or more, 10 or more, 20 or more, or even 50 or more devices that produce light and combine together to form the light source. The light source may include 500 or less, 300 or less, or 200 or less devices that produce light. For example, if the light source is a 10×10 array of light devices and some of the 100 devices may be selectively turned on and off, dimmed, brightened, or a combination thereof. The light source may be located a distance from the pivot point. The light source may be located toward a forward end region of the light connector. The light source may be located between the pivot point and the adjustment fastener, the bias member, or both. The light source may be located about 3 mm or more, about 5 mm or more, about 7 mm or more, or about 10 mm or more from the pivot point. The light source may be located about 40 mm or less, about 30 mm or less, about 20 mm or less, or about 15 mm or less from the pivot point. The light source may be static or static relative to the light connector. The light source may be free of movement. The light source may be fixed. The light source may direct light in a predetermined direction. The light source may directly project light from the vehicle. The light source may indirectly direct light from the vehicle (e.g., may project light towards a vehicle connector that reflects the light outward). The light source may be located on a top, on a bottom, or both of a light connector. The light source may be connected to or be part of a heat sink, a printed circuit board (PCB), a light connector, or a combination thereof.

The light connector may function to connect the light source to a vehicle, a vehicle connector, or both. The light connector may function to move the light source, direct the light source (e.g., aim the light source), or both. Each light system may include one light connector. Each light system may have one or more light connectors or a plurality of light connectors. The light system may have one or more light sources and each of the light sources may include a light connector. The light connector may be connected to a vehicle connector and may allow the light source to move relative to the vehicle connector. The light connector may be movable in an x-direction, y-direction, z-direction, or a combination thereof. The light connector may adjust the light source so that all of the light sources may be aimed in a same direction, the light sources may be adjusted for any tolerance differences that may exist, the light sources may be adjusted for variation, or a combination thereof. The light connector may be movable 1 mm or more, 2 mm or more, 3 mm or more, or even 5 mm or more. The light connector may be movable 10 cm or less, 5 cm or less, or 2 cm or less. The light connector may be movable by an angle of about ±0.5 degrees or more, about ±1.0 degrees or more, about ±1.5 degrees or more, or about ±2.0 degrees or more. The light connector may be movable by an angle of about ±10 degrees or less, about ±7 degrees or less, about ±5 degrees or less, or about ±3 degrees or less. The light connector may be adjusted at a forward end, a rearward end, a left side, a right side, or a combination thereof. The light connector may rotate about a pivot point. The light connector may be moved from a nominal position (e.g., a neutral position). The light connector may be moved to a raised position, a lowered position, or both. The light connector includes a body and a bias member. The body and the bias member are movable relative to each other. The body may be a main part of the light connector, may support the light source, or both. The body may extend along an axis. The body may include a fastener recess, accept the adjustment fastener, or both. The light connector may be adjusted via adjustment fasteners and fastener recesses.

The fastener recesses may function to permit a connection to formed between the light connector and the vehicle connector. The fastener recesses may permit an adjustment fastener to extend through the light connector. The fastener recesses may permit adjustment fasteners to extend partially or completely through the light connector. The fastener recesses may permit adjustment fasteners to extend through the light connector into contact with the vehicle connector so that the light connector may be moved relative to the vehicle connector. The fastener recesses may be threaded, include detents, be smooth, be about the same size and the adjustment fasteners, or a combination thereof. Preferably, each of the fastener recesses form a movable connection with an adjustment fastener. The light connector may have one or more, two or more, three or more, or four or more fastener recesses. The fastener recesses or aperture may be located on the light connector in a location to adjust the light connector in a specific direction. The faster recess may be a through hole in the body of the light connector. The fastener recesses may be located on the forward end, in a forward end region, rearward end, a rearward end region, left side, a left side region, right side, a right side region, or a combination thereof (relative to a forward facing direction of a light). Region may be a distance from a terminal edge (e.g., inward from a terminal edge a distance (e.g., about 2 mm or more, about 5 mm or more, about 3 cm or less, or about 1 cm or less). For example, the fastener recesses may be located on a forward end to raise and lower the forward end or the rearward end. In another example, the fastener recesses may be located on a left side or right side to tilt the light connector left or right. Each fastener recess may hold one adjustment fastener so that as more or less of the adjustment fastener extends through the fastener recess a position of the light connector is moved relative to the vehicle connector.

The adjustment fasteners function to move the light connector in a predetermined direction or a desired direction. The adjustment fasteners may lock the light connector or the light source in a position. The adjustment fastener may bias a bias member. The adjustment fastener may allow the bias member to move the light connector in a direction. For example, if the adjustment fastener is moved in a first direction the bias member may be biased (e.g., compressed) and if the adjustment fastener is moved in a second direction the bias member may discharge a force or stored energy. The adjustment fastener may connect to both the light connector and the vehicle connector so that once the position of the light source, the light connector, or both is set the position may be maintained. The adjustment fastener may include threads that lock the light connector in a position. The adjustment fasteners may be free of locking features. Preferably, the adjustment fasteners are a bolt, screw, a threaded device, a device with detents, a device with stops, or a combination thereof. The adjustment fasteners may include detents that the light connector, the vehicle fastener, or both contact and are held in a position or vice versa. The adjustment fasteners may be located in position relative to the light connector, the vehicle connector, or both and may be movable relative to the other of the light connector or the vehicle connector. For example, the adjustment fastener and the light connector may be fixed relative to each other and the light connector may be adjusted by moving relative to the vehicle connector. The adjustment fastener may be located a distance from the pivot point. The adjustment fastener may be located in a rearward end region and the pivot point may be located in a forward end region. The bias member, light source, or both may be located between the pivot point and the adjustment fastener. The adjustment fastener may be located about 10 mm or more, about 20 mm or more, or about 30 mm or more from the pivot point. The adjustment fastener may be located about 100 or less, about 75 mm or less, about 50 mm or less, or about 40 mm or less from the pivot point. The adjustment fastener may resist a force of bias member when the adjustment fastener is in a fixed position. The adjustment fasteners may be moved by a bias member when the adjustment fastener is moving.

The bias member functions to move the light connector, the light source, or both in a direction. The bias member may function to resist movement of the light connector, the light source, or both in a direction. The bias member may extend between the light connector and the vehicle connector. The bias member may be a separate part that is located between the vehicle connector and the light connector. The bias member may extend over the adjustment fastener. For example, the bias member may be a ring that slides over the adjustment fastener and as the light connector moves, the bias member may be compressed or may expand. The bias member may extend from the light connector, the body of the light connector, or both. The bias member may face a forward end. The bias member may face a rearward end. The bias member may be extended from a plane of the light connector towards the vehicle connector. The bias member may extend from the vehicle connector towards the light connector. The bias member may be a monolithic part of the light connector, the body, or both. The bias member in the nominal position may extend above the plane of the body. The bias member in the nominal position may extend below the plane of the body. The bias member in the nominal position may extend be coplanar with the body. The bias member may be a finger that extends between the light connector and the vehicle connector. Then bias member may be made of rubber, an elastomer, spring steel, or a combination thereof. The bias member may be located above the body of the light connector in the nominal position, raised position, lowered position, or a combination thereof. The bias member may be located below the body of the light connector in the nominal position, raised position, lowered position, or a combination thereof. The bias member may be coplanar with the body of the light connector in the nominal position, raised position, lowered position, or a combination thereof. The bias member may be straight, have a cantilever connection, be helically wrapped, bowed, connected on two ends, be U shaped, be V shaped, or a combination thereof. The bias member may be located between a rearward end region and a forward end region. The bias member may extend from a body of the light connector. The bias member may be coplanar with the body of the light connector when the light connector is in the lowered position. The bias member may be in a different plane as the body of the light connector when the light connector is in the nominal position, the raised position, or both. For example, the bias member may be located at least partially in a plane below the body when the light connector is in the nominal position or the raised position. The bias member may be located in a central region of the light connector. The light source may be located between the pivot point and the bias member. The bias member may be located about 10 mm or more, about 20 mm or more, or about 25 mm or more from the pivot point. The adjustment fastener may be located about 80 or less, about 60 mm or less, about 45 mm or less, or about 35 mm or less from the pivot point. The bias member may create a force of about 1 N or more, about 3 N or more, or about 5 N or more. The bias member may create a force of about 50 N or less, about 25 N or less, or about 15 N or less. The bias member may assist in moving the light connector about a pivot point.

The pivot point may function to permit movement of the light connector in one or more directions while maintaining a position of a portion of the light connector. The pivot point may prevent movement of the light connector in two or more directions. The pivot point may prevent movement side to side, left and right, up and down, or a combination thereof. The pivot point may allow for movement side to side, left and right, up and down, or a combination thereof. Preferably, the pivot point may allow for up and down movement. The pivot point may prevent movement of one part of the light connector while allowing movement of other parts of the light connector. The pivot point may be located at virtually any location of the light connector. The pivot point may be located in a middle region, an end region, a side region, or a combination thereof of the light connector. The pivot point may be located in a middle region of the light connector. For example, if one end is moved up then the opposite is moved down (e.g., in a teeter totter action). Preferably, the pivot point is located in an end region of the light connector. The pivot point may be located at a forward end. The pivot point may cause an arcuate movement of the light connector. The arcuate movement may have a rearward end moving a greater distance than the forward end due to the rearward end being located further from the pivot point. The pivot point may restrict movement of a portion of the light connector and allow for movement of the light connector in virtually all other directions. For example, if the pivot point is in a central region then the light connector may articulate about the pivot point. Preferably, the pivot point is located in an end region or at an end of the light connector. The pivot point may be connected at one end to a vehicle connector. The pivot point may be in communication with a vehicle connector. The pivot point may move about the vehicle connector.

The vehicle connector functions to be a support for the lighting system, the light source, a light connector, or a combination thereof. The vehicle connector may be part of the vehicle. The vehicle connector may be a separate piece that is connected to a vehicle. The vehicle connector may be a static piece. The vehicle connector may be immovable once connected to a vehicle. The vehicle connector may have one or more points of contact with the light connector. Preferably, the vehicle connector and the light connector have two or more points of contact. More preferably, the vehicle connector and the light connector have three or more points of contact. The vehicle connector may receive one or more parts of the light connector, be in contact with one or more parts of the light connector, or both. The vehicle connector may include one or more fastener connectors that receive one or more adjustment fasteners.

The fastener connectors functions movably receive one or more adjustment fasteners. The fastener connector may be static and allow one or more adjustment fasteners to move relative to the fastener connector. The fastener connectors may lock an adjustment fastener in a position. The fastener connector may allow an adjustment fastener to move and then lock the adjustment fastener in a position. The fastener connectors may be a recess. The fastener connectors may be smooth, threaded, include detents, include through holes, include recesses, include locking points, include stopping points, or a combination thereof. A combination of the fastener connectors and the adjustment fasteners may permit for fine movements there between so that the light connector may be finely adjusted relative to the vehicle connector. The fastener connector may be located opposite a pivot point. The fastener recesses may be located on a forward end, a rearward end, a side, or a combination thereof. The fastener recesses may be located proximate to a bias arm.

The bias arm functions to assist a bias member in biasing the light connector relative to the vehicle connector. The bias arm may be part of the vehicle connector. The bias arm may form a platform that the bias member contacts to create a bias force. The bias arm may create a bias force against the bias member. The bias arm may have a flat end. The bias arm may be static. The bias arm may be movable. The bias arm may have a portion that is movable to impart a force. The bias arm may be immovable. The bias arm may create a contact location for the bias member so that as the light connector is moved a force is generated or stored by the bias member relative to the bias arm. The bias arm may extend towards the light connector a distance (e.g., have a height). The bias arm may extend upward a distance that is less than a distance the fastener connector extends upward. The bias arm may extend upward a distance greater than a distance the fastener connector extends upward. The bias arm and the bias member may move the light connector about a pivot point, a pivot anchor, or both.

The pivot anchor functions to support a portion of the light connector so that the light connector is movable about a pivot point. The pivot anchor may form a movable connection. The pivot anchor may permit movement in one or more directions, two or more directions, three or more directions, four or more directions, five or more directions, or even six or more directions. Preferably, the pivot anchor restricts movement of the light connector in some directions and allows for movement of the light connector in some directions. The pivot anchor may allow for movement along an arc. The pivot anchor may permit movement generally up and down along a plane (e.g., the light connector may move up and down in an arcuate fashion). The pivot anchor may extend over a portion of the light connector. The pivot anchor may be a single point or a single line that contacts the light connector. The pivot anchor may be "C" shaped, "U" shaped, "V" shaped, or a combination thereof. The pivot anchor may extend along a top of the light connector (e.g., a body of the light connector). The pivot anchor may extend along a bottom of the light connector. The pivot anchor may extend along both the top and the bottom of the light connector. The pivot anchor may be in contact with a side or edge of the light connector. The pivot anchor may only contact an end or end region of a body of the light connector. A contact location between the pivot anchor and the light connector may remain constant as the light connector moves between the nominal position, the raised position, the lowered position, or a combination thereof. An amount of contact between the pivot anchor and the light connector may vary as the light connector is moved between the nominal position, the raised position, the lowered position, or a combination thereof.

The nominal position functions to be a zero position or an initial position. The nominal position may be a starting position for the light source. The nominal position may have a nominal axis (or nominal plane). The nominal axis may extend along the light connector, a body of the light connector, or both when the light connector is in the nominal position. The nominal position may accurately aim a majority (e.g., 80 percent or more, 90 percent or more, or about 95 percent or more, but less than 100 percent) of the light of the light sources to a desired location. The nominal position may be a position where all of the light of the light sources are theoretically all aimed to a same location or a substantially same location. The nominal position may be where the bias member is at a zero bias. Preferably, the bias member is biased in the nominal position. In the nominal position the bias member may be biased about 0.1 mm or more, about 0.2 mm or more, about 0.5 mm or more, about 0.7 mm or more, or about 1 mm or more. In the nominal position the bias member may be biased about 5 mm or less, about 3 mm or less, about 2 mm or less, or about 1.5 mm or less. In the nominal position, the bias member may extend at an angle of about 0.5 degrees or more, about 1 degree or more, about 2 degrees or more, or about 3 degrees or more relative to a body of the light connector. In the nominal position, the bias member may extend at an angle of about 10 degrees or less, about 7 degrees or less, or about 5 degrees or less relative to a body of the light connector. In the nominal position the bias member may have a sufficient amount of energy stored that the bias member may assist in moving the light connector to the raised position.

The raised position may function to lift one end or side of the light connector to adjust the light to be aimed at the desired location. The raised position may have a raised axis (or raised plane). The raised axis may extend along the light connector, a body of the light connector, or both when the light connector is in the raised position. The raised axis and the nominal axis may be separated by an angle. The raised position may be where a rear end of the light source, light connector or both are lifted relative to a nominal position. The raised position may angle the light from the light source downward. The raised position may raise two different ends or sides (e.g., a rear end and a forward end) of the light connector the same distance. Preferably, the raised position raises two different ends or sides different distances. For example, in the raised position the rear end may be moved the farthest due to the arcuate movement of the light connector. For example, the light source may be located back from a front end of the light connector and a forward end of the light source may be moved a smaller distance than the rear end of the light source. A ratio of the distance of movement of the rear end (e.g., of the light source, the light connector, or both) relative to a distance of movement of the front end (e.g., of the light source, the light connector, or both) may be about 1.5:1 or more, about 2:1 or more, about 3:1 or more, about 5:1 or more, or about 6:1 or more. A ratio of the distance of movement of the rear end (e.g., of the light source, the light connector, or both) relative to a distance of movement of the front end (e.g., of the light source, the light connector, or both) may be about 10:1 or less, about 7:1 or less, or about 6.5:1 or less. In the raised position, the bias member may form an angle of about 1 degree or more, about 2 degrees or more, about 3 degrees or more, or about 4 degrees or more relative to a body of the light connector. In the raised position, the light connector may form an angle of about 10 degrees or less, about 7 degrees or less, or about 5 degrees or less relative to a body of the light connector. The bias member, in the raised position, may move about ±0.5 degrees, ±1 degree, ±2 degrees, or ±3 degree relative from the nominal position. In the raised position, the light connector may have a maximum gap from the vehicle connector. The gap may be about 1 mm or more, about 2 mm or more, or about 3 mm or more (e.g., at a rearward end of the connector). The gap may be about 10 mm or less, about 7 mm or less, or about 5 mm or less. In the raised position the light source (e.g., a forward end) may move about 0.1 mm or more, about 0.2 mm or more, or about 0.3 mm or more form the nominal position. In the raised position, the bias member may be free of deformation. In the raised position, the bias member may be in contact with the bias arm but be free of a force between the bias member and the bias arm. The raised position may be a positive position and the lowered position may be negative position relative to the nominal position.

The lowered position may function to lower one end or side of the light connector to adjust the light to be aimed at the desired location. The lowered position may have a lowered axis (or lowered plane). The lowered axis may extend along the light connector, a body of the light connector, or both when the light connector is in the lowered position. The lowered axis and the nominal axis may be separated by an angle. The lowered position may be where a light connector has a rear end of the light source, light connector or both lowered relative to a nominal position. The lowered position may angle the light from the light source upward. The lowered position may lower two different ends or sides (e.g., a rear end and a forward end) of the light connector the same distance. Preferably, the lowered position lowers two different ends or sides different distances. For example, in the lowered position the rear end may be moved the farthest due to the arcuate movement of the light connector. For example, the light source may be located back from a front end of the light connector and a forward end of the light source may be moved a smaller distance than the rear end of the light source. A ratio of the distance of movement of the rear end (e.g., of the light source, the light connector, or both) relative to a distance of movement of the front end (e.g., of the light source, the light connector, or both) may be about 1.5:1 or more, about 2:1 or more, about 3:1 or more, about 5:1 or more, or about 6:1 or more. A ratio of the distance of movement of the rear end (e.g., of the light source, the light connector, or both) relative to a distance of movement of the front end (e.g., of the light source, the light connector, or both) may be about 10:1 or less, about 7:1 or less, or about 6.5:1 or less. In the lowered position, the bias member may form a nominal angle (e.g., may be negative) of about 1 degree or more, about 2 degrees or more, about 3 degrees or more, or about 4 degrees or more relative to a body of the light connector. In the lowered position, the light connector may form a nominal angle of about 10 degrees or less, about 7 degrees or less, or about 5 degrees or less relative to a body of the light connector. The bias member, in the lowered position, may move about ±0.5 degrees, ±1 degree, ±2 degrees, or ±3 degree relative from the nominal position. In the lowered position the light connector may be moved as far along the adjustment fastener as the light connector may move downward. In the lowered position, the light connector may have a minimal gap from the vehicle connector. There may be no gap in the lowered position. The gap may be about 3 mm or less, about 2 mm or less, or about 1 mm or less (e.g., at a rearward end of the connector). The gap may be about 0 mm or more, about 0.01 mm or more, or about 0.1 mm or more. In the lowered position the light source (e.g., a forward end) may move about ±0.1 mm or more, about ±0.2 mm or more, or about ±0.3 mm or more form the nominal position (negative denotes downward away from the nominal position). In the lowered position, the bias member may be free of deformation. Preferably, in the lowered position, the bias member may be at a maximum deflection. In the lowered position, the bias member may be in contact with the bias arm and may have a force between the bias member and the bias arm that is greater than a force in the nominal position and the raised position. The raised position may be a positive position and the lowered position may be negative position relative to the nominal position. The light connector, the light source, or both may be moved between the nominal position, the raised position, and the lowered position by a method taught herein.

The method may function to move the light source, the light connector, or both so that the light is aimed in a predetermined direction. The light connector may be adjusted. The light connector may be adjusted by moving the adjustment fastener. The adjustment fastener may provide rotary to linear movement. For example, when the adjustment fastener is rotated the light connector may move along a rotational axis of the adjustment fastener. The bias member may be released so that the bias member moves the light connector, the light source, or both. The bias member may be compressed to store energy. The light connector may be moved in the x-direction, the y-direction, the z-direction, or a combination thereof.

FIG. 1 is a side view of a vehicle 70 including a lighting system 6 having a light source 8 that projects light 72 outward from the vehicle 70.

Figure 2:
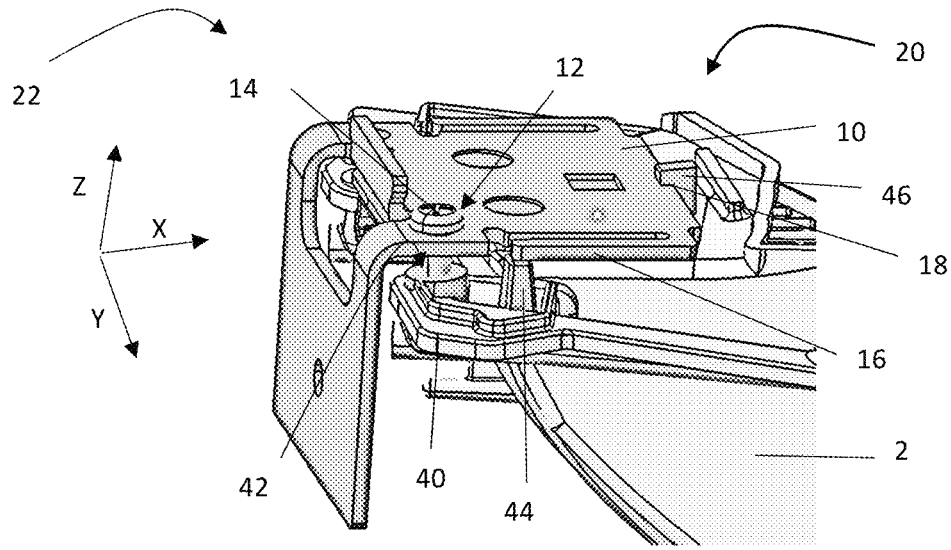
FIG. 2 is a perspective view of a light connector and vehicle bracket.

FIG. 2 is a perspective view of a light connector 10 connected to a vehicle bracket 2. The vehicle bracket 2 includes a vehicle connector 40 including a fastener connector 42 to receive an adjustment fastener 14. The adjustment fastener 14 extends through a fastener recess 12 in the light connector 10 and into the fastener connector 42 in the vehicle connector 40 to movably connect the light connector 10 to the vehicle connector 40. The vehicle connector 40 has a bias arm 44 that a bias member 16 contacts to create a bias force. The vehicle connector 40 also includes a pivot anchor 46 that is in communication with the light connector 10 and forms a pivot point 18 that the light connector 10 moves about. The pivot anchor 46 is located at a forward end 20 and the adjustment fastener 14 is located at the rearward end 22.

Figure 3:
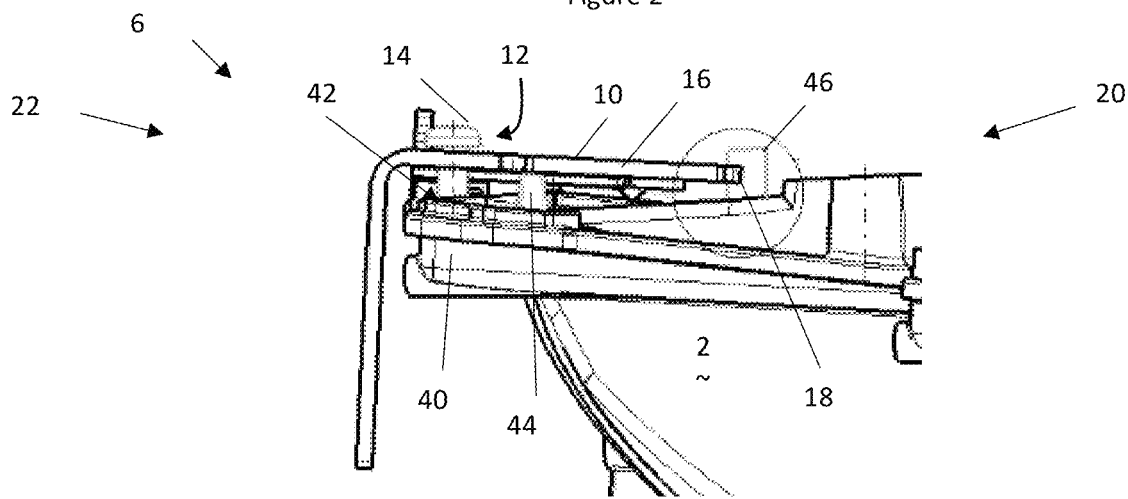
FIG. 3 is a side view of a light connector and vehicle bracket.

FIG. 3 is a side view of a connection between the light connector 10 and the vehicle bracket 2 of a light system 6. An adjustment fastener 14 is located at the rearward end 22 and the adjustment fastener extends through a fastener recess 12 into a fastener connector 42 in the vehicle connector 40. The forward end 20 includes a pivot anchor 46 in contact with the light connector 10 forming a pivot point 18. Between the forward end 20 and the rearward end 22 is a bias member 16 in contact with a pivot anchor 46 and the bias member 16 moves the light connector 10 relative to the bias arm 44.

Figure 4:
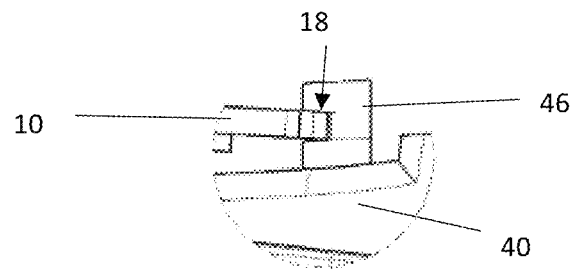
FIG. 4 is a close-up view of a pivot anchor in communication with a light connector.

FIG. 4 is a close-up view of the pivot point 18 between the light connector 10 and the pivot anchor 46. The pivot anchor 46 is part of the vehicle connector 40 and extends upward from the vehicle connector 40 (e.g., in the "z" direction).

Figure 5A:
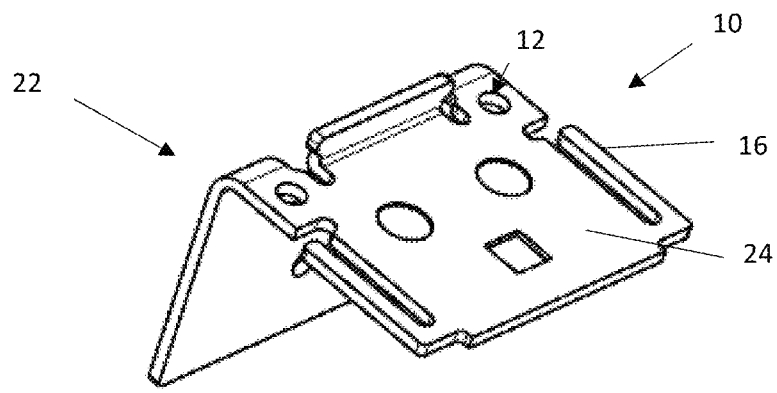
FIG. 5A is a perspective view of the light connector.

FIG. 5A is a perspective view of a light connector 10. The bias members 16 extend from the body 24 towards a rearward end 22 of the light connector 10.

Figure 5B:
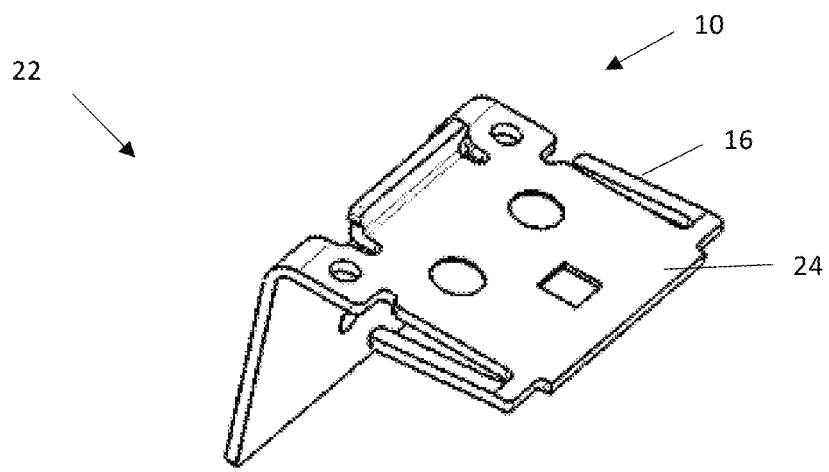
FIG. 5B is a perspective view of a light connector.

FIG. 5B is a perspective view of the light connector 10. The bias members 16 face extend from the body 24 towards a rearward end 22 of the light connector 10.

Figure 5C:
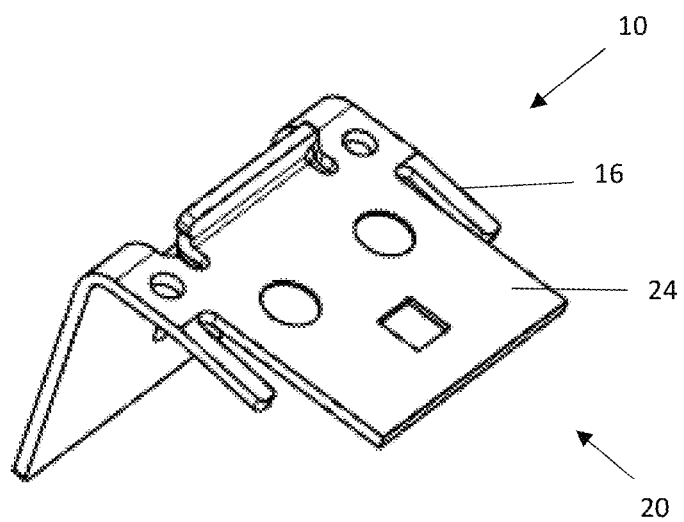
FIG. 5C is a perspective view of a light connector.

FIG. 5C is a perspective view of the light connector 10. The bias members 16 extend from the body 24 towards a forward end 20 of the light connector.

Figure 6:
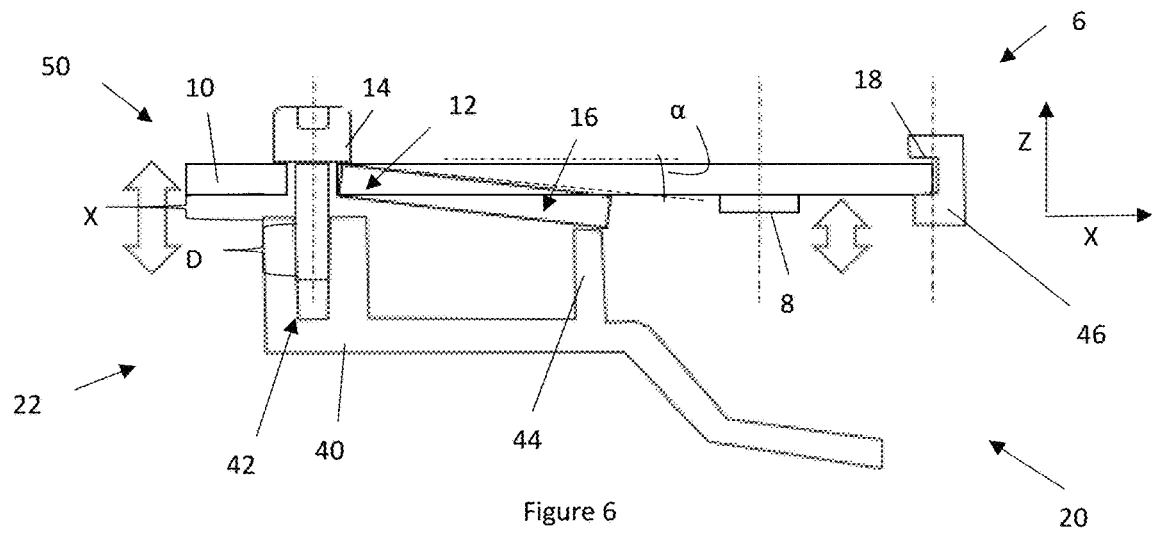
FIG. 6 is a side view of a light connector and a vehicle connector in nominal position.

FIG. 6 shows a side view of a lighting system 6 in a nominal position 50. The lighting system 6 includes a light connector 10 that is connected to and movable relative to a vehicle connector 40. In the nominal position 50 a gap is located between the light connector 10 and the vehicle connector 40 having a size (X). The light connector 10 has a forward end 20 and a rearward end 22 with the rearward end 22 including a fastener recess 12 that receives an adjustment fastener 14. A bias member 16 extends downward below a plane of the light connector 10 into contact with a bias arm 44 at an angle ($\alpha$). The light connector 10 includes a pivot point 18 where the light connector 10 is in contact with a pivot anchor 46 the vehicle connector 40. As the adjustment fastener 14 is moved into the fastener connector 42 the light connector 10 is moved towards or away from the vehicle connector 40 about the pivot point 18 so that the light source 8 is focused. As shown, the adjustment fastener 14 is moved into the fastener connector 42 a distance (D).

Figure 7:
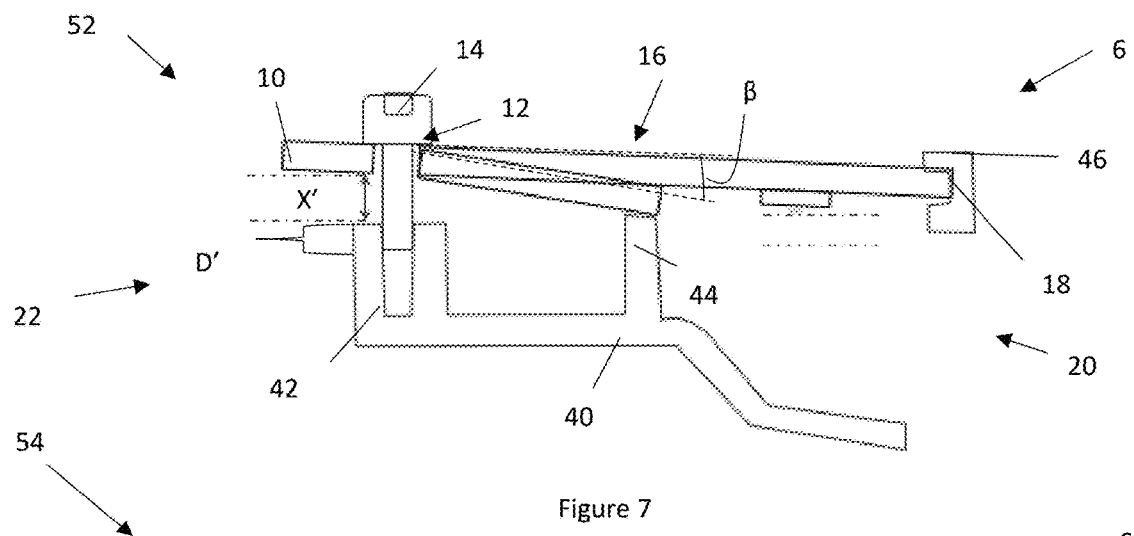
FIG. 7 is a side view of a light connector and a vehicle connector in a raised position.

FIG. 7 shows the lighting system 6 in a raised position 52. In the raised position 52, the adjustment fastener 14 is moved through the fastener connection 42 so that the adjustment fastener 14 extends into the fastener recess 12 a distance (D'). The bias member 16 biases the light connector 10 upward away from the bias arm 44 as the fastener 14 is moved so that the bias arm 16 and the light connector 10 form an angle of ($\beta$). In the raised position 52, the light connector 10 is located a distance (X') from the vehicle connector 40. As the light connector 10 moves, a pivot point 18 of the light connector 10 moves about a pivot anchor 46 of the vehicle connector 40 so that a rearward end 22 moves a greater distance than the forward end 20.

Figure 8:
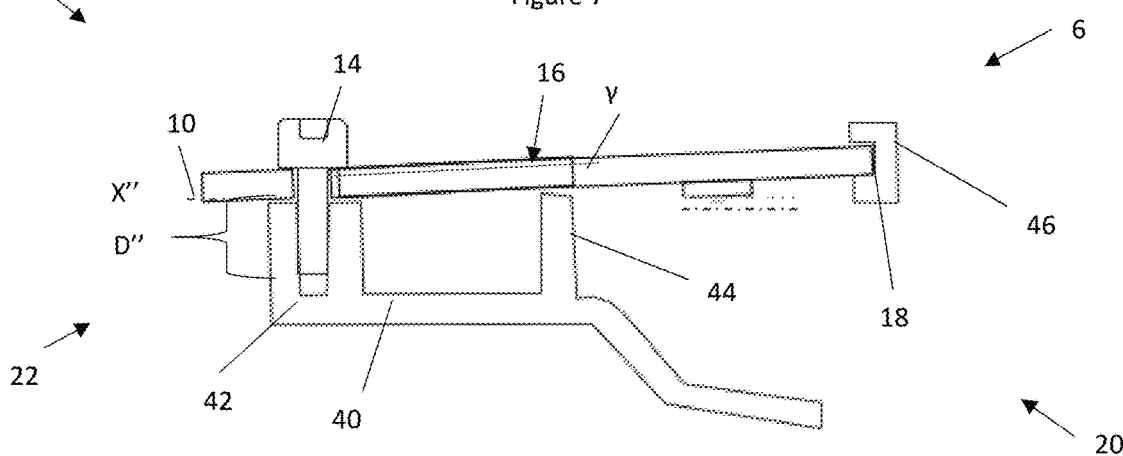
FIG. 8 is a side view of a light connector and a vehicle connector in a lowered position.

FIG. 8 shows the lighting system 6 in a lowered position 54. In the lowered position 54, the adjustment fastener 14 is moved into the fastener connection 42 so that the adjustment fastener 14 extends into the fastener connector 42 a distance (D"). The bias member 16 and the light connector 10 are biased downward towards the bias arm 44 as the fastener 14 is moved so that the bias arm 16 and the light connector 10 form an angle of ($\gamma$). In the lowered position 54, the light connector 10 is located a distance (X") from the vehicle connector 40. As the light connector 10 moves, a pivot point 18 of the light connector 10 moves about a pivot anchor 46 of the vehicle connector 40 so that a rearward end 22 moves a greater distance than the forward end 20.

Figure 9A:
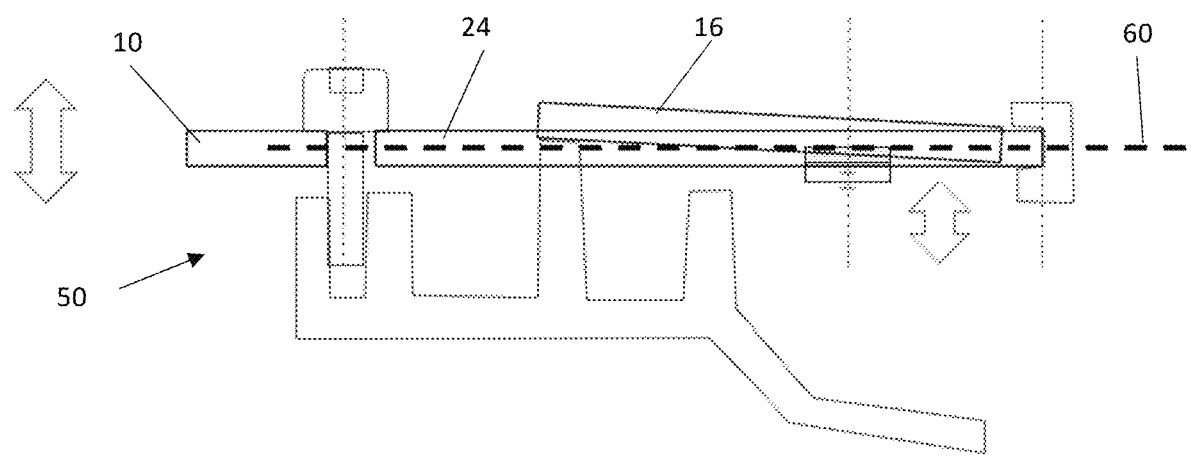
FIG. 9A is a side view of a light connector and a vehicle connector in nominal position.

FIG. 9A shows the light connector 10 having a body 24 and bias member 16 in the nominal position 50. The bias member 16 is located above the body 24. The body 24 extends along a nominal axis 60.

Figure 9B:
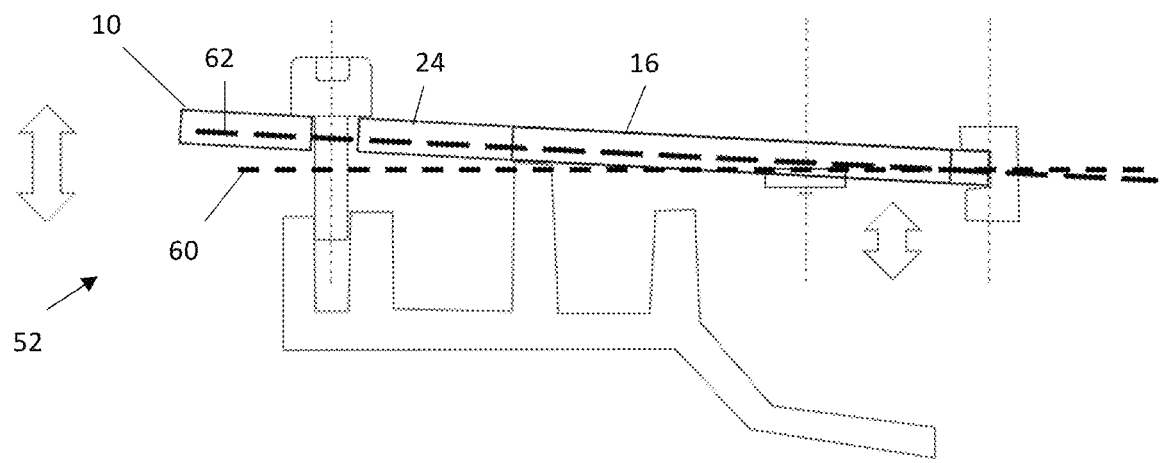
FIG. 9B is a side view of a light connector and a vehicle connector in a lowered position.

FIG. 9B shows the body 24 of the light connector 10 moved to a raised position 52 where the body 24 and the bias member 16 are coplanar. The body 24 is moved a distance from the nominal axis 60 to a raised axis 62.

Figure 9C:
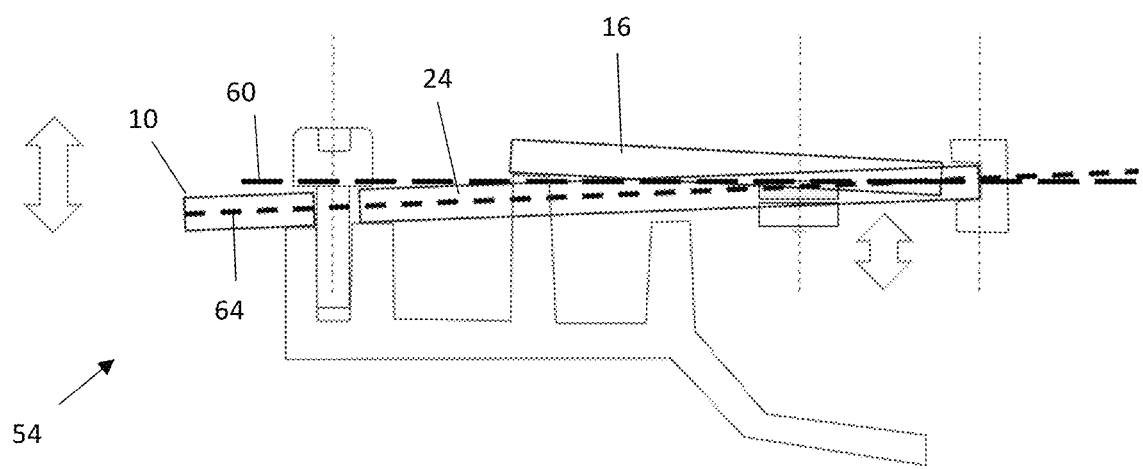
FIG. 9C is a side view of a light connector and a vehicle connector in a lowered position.

FIG. 9C shows the body 24 of the light connector 10 moved to a lowered position 54 where the body 24 is located below the bias member 16. The body 24 is moved a distance from the nominal axis 60 to a lowered axis 64.

Figure 10A:
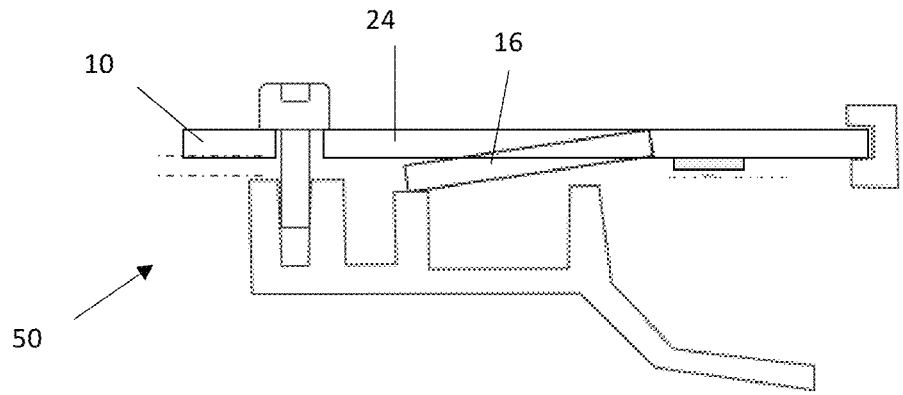
FIG. 10A is a side view of a light connector and a vehicle connector in nominal position.

FIG. 10A shows the light connector 10 having a body 24 and bias member 16 in the nominal position 50. The bias member 16 is located below the body 24. The body 24 extends along a nominal axis 60.

Figure 10B:
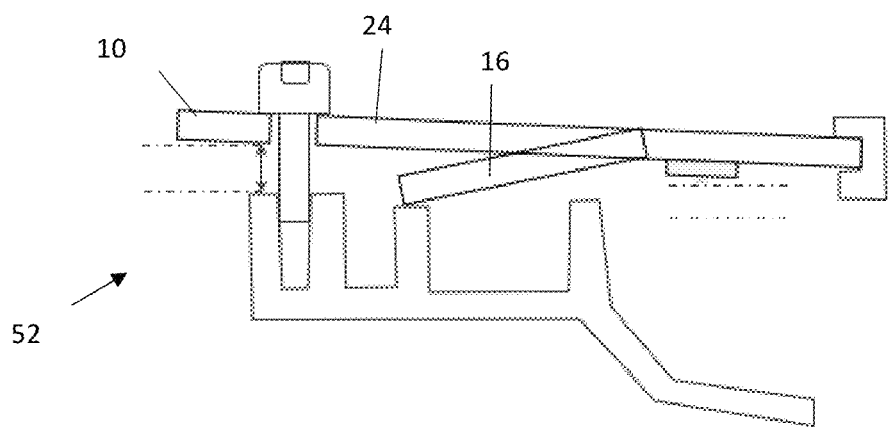
FIG. 10B is a side view of a light connector and a vehicle connector in a lowered position.

FIG. 10B shows the body 24 of the light connector 10 moved to a raised position 52 where the body 24 is moved a distance further from the bias member 16 relative to the nominal position, and the bias member 16 extends below the body 24. The body 24 is moved a distance from the nominal axis 60 to a raised axis 62.

Figure 10C:
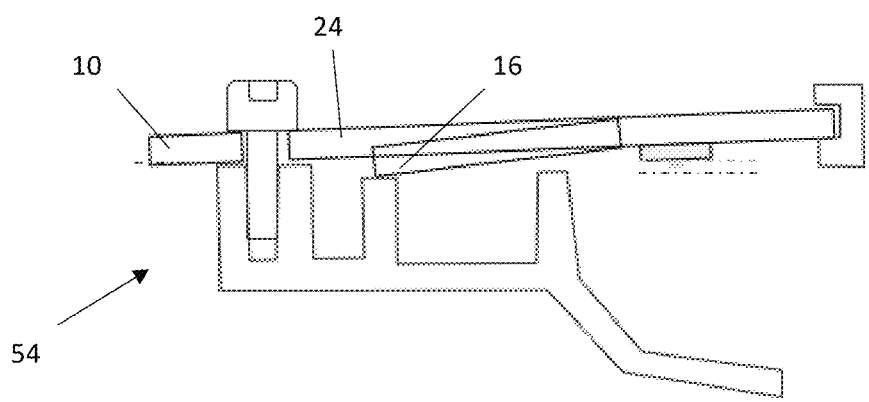
FIG. 10C is a side view of a light connector and a vehicle connector in a lowered position.

FIG. 10C shows the body 24 of the light connector 10 moved to a lowered position 54 where the body 24 is located below the bias member 16 but is located closer to the body 24 then in the nominal position. The body 24 is moved a distance from the nominal axis 60 to a lowered axis 64.

Figure 11:
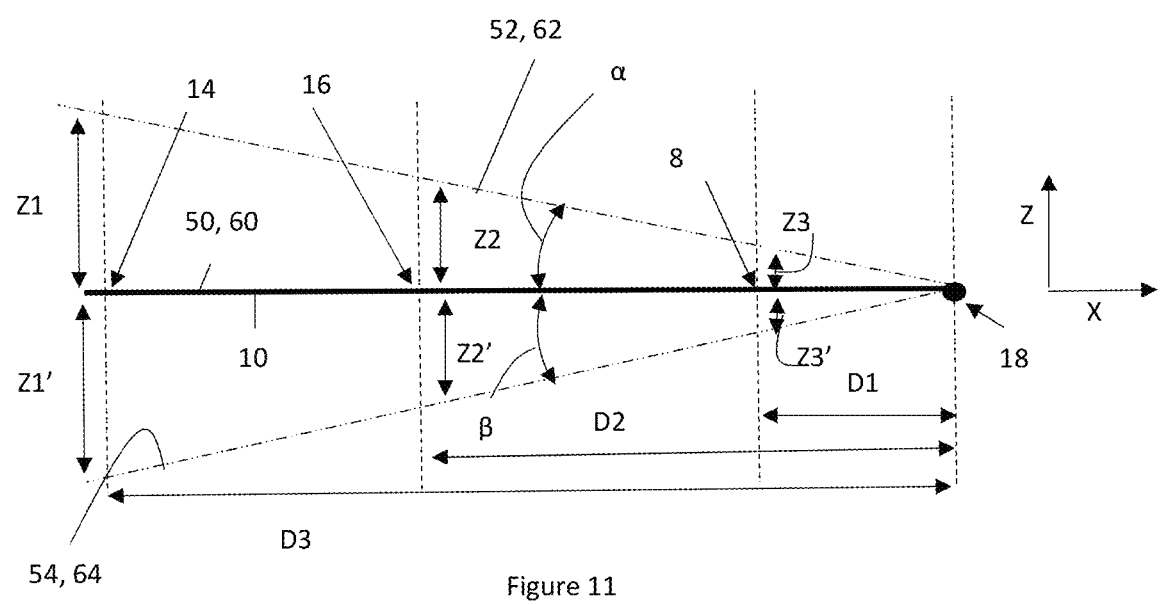
FIG. 11 is a schematic of the movement of the light connector between the raised position and the lowered position.

FIG. 11 is a schematic view of movement of the light connector 10 from the nominal position 50 (having a nominal axis 60) to the raised position 52 (having a raised axis 62) and from the nominal position 50 to the lowered position 54 (having a lowered axis 64). The light connector 10 includes a pivot point 18 that remains generally stationary during movement of the light connector 10. A light source 8 is located a distance (D1) from the pivot point 18. A bias member 16 is located a distance (D2) from the pivot point 18. An adjustment fastener 14 is located a distance (D3) from the pivot point 18. When the light connector 10 moves from the nominal position 50 to the raised position 52 the light connector 10 changes by an angle ($\alpha$). The angle ($\alpha$) causes the light 8 to move a distance Z3, the bias member 16 to move a distance Z2 (which is greater than Z3) and the adjustment fastener to move a distance Z1 (which is greater than both Z2 and Z3). When the light connector 10 moves from the nominal position 50 to the lowered position 54 the light connector 10 changes by an angle ($\beta$). The angle ($\beta$) causes the light 8 to move a distance Z3', the bias member 16 to move a distance Z2' (which is greater than Z3') and the adjustment fastener to move a distance Z1' (which is greater than both Z2' and Z3').

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle Bracket
6 Lighting System
8 Light Source
10 Light Connector
12 Fastener Recess
14 Adjustment Fastener
16 Bias Member
18 Pivot Point
20 Forward End
22 Rearward End
24 Body
40 Vehicle Connector
42 Fastener Connector
44 Bias Arm
46 Pivot Anchor
50 Nominal Position
52 Raised Position
54 Lowered Position
60 Nominal Axis (Plane)
62 Raised Axis (Plane)
64 Lowered Axis (Plane)
70 Vehicle
72 Light

We claim:

1. A light system comprising:
   a. a vehicle connector configured to connect to a vehicle;
   b. a light connector in communication with the vehicle connector, the light connector being movable relative to the vehicle connector; and
   c. a bias member connected to the light connector and extending into contact with the vehicle connector so that as the light connector is adjusted the bias member creates a bias force to move the light connector away from the vehicle connector or the bias member is compressed to store energy.

2. The light system of claim 1, wherein the bias member is a monolithic part of the light connector.

3. The light system of claim 1, wherein the bias member extends downward below a plane of the light connector.

4. The light system of claim 1, wherein the light connector is movable from a nominal position to a raised position, a lowered position, or both.

5. The light system of claim 4, wherein the bias member forms an angle of about 5 degrees or more and about 45 degrees or less with the light connector when the bias member is in the nominal position.

6. The light system of claim 4, wherein an angle of the bias member changes by about 5 degrees or more and about 15 degrees or less relative to the light connector when the bias member is moved from the nominal position to the raised position.

7. The light system of claim 4, wherein an angle of the bias member changes by about 2 degrees or more and about 10 degrees or less relative to the light connector when the bias member is moved from the nominal position to the lowered position.

8. The light system of claim 1, wherein an adjustment fastener extends between the light connector and the vehicle connector.

9. The light system of claim 8, wherein the adjustment fastener compresses the bias member when the light connector is moved towards a lowered position.

10. The light system of claim 8, wherein the bias member moves the light connector away from the vehicle connector when the adjustment fastener is moved towards a raised position.

11. The light system of claim 1, wherein the light connector includes a pivot point that is in contact with a pivot anchor of the vehicle connector.

12. The light system of claim 11, wherein the pivot point is a forward end of the lighting system.

13. The light system of claim 11, wherein the light connector moves about the pivot point so that a rearward end of the light connector moves a further distance than a forward end of the light connector.

14. The light system of claim 1, wherein the light connector is a heatsink or a printed circuit board.

15. The light system of claim 8, wherein the adjustment fastener is a bolt or a screw.

16. The light system of claim 15, wherein the bolt or the screw is screwed into the vehicle connector.

17. The light system of claim 1, wherein the light connector includes a fastener recess and an adjustment fastener extends through the fastener recess into the vehicle connector.

18. A method comprising:
   a. adjusting a lighting system of a vehicle by moving a light connector relative to a vehicle connector;
   b. deflecting a bias member between the light connector and the vehicle connector when the light connector is moved towards a lowered position; and
   c. releasing energy from the bias member when the light connector is moved towards a raised position so that the bias member moves the light connector away from the vehicle connector.

19. The method of claim 18, wherein the lighting system includes an adjustment fastener and the adjustment fastener is rotated to assist in moving the light connector between the lowered position and the raised position.

20. The method of claim 18, wherein a rearward end of the light connector is moved a greater distance than a forward end of the light connector as the light connector is moved.

* * * * *